RESPONSE OF PVC-DOP MEMBRANE TO QUATERNARY AMMONIUM IONS

A - TETRAPROPLYAMMONIUM : SLOPE=-57.5
B - TETRAPENTYLAMMONIUM : SLOPE=-59.5
C - TETRAHEXYLAMMONIUM : SLOPE=-58.5

RESPONSE OF PVC-AMIDE MEMBRANE TO TETRABUTYLAMMONIUM BROMIDE IN DISTILLED WATER

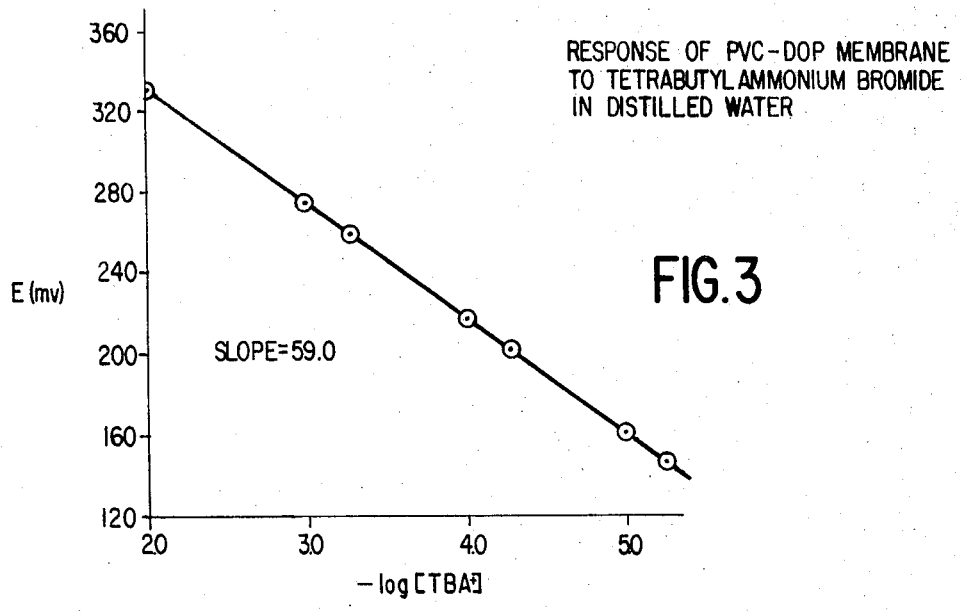
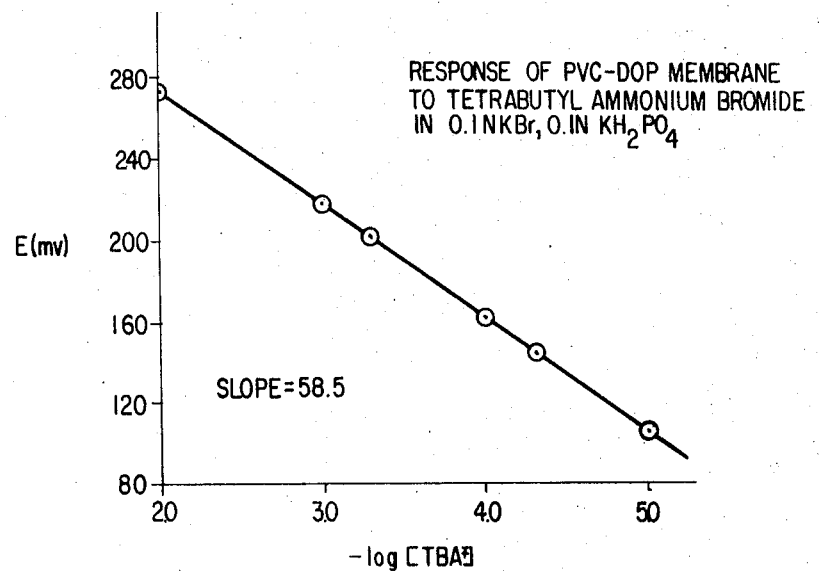

RESPONSE OF NYLON-PHENOL MEMBRANE TO SODIUM TETRAPHENYLBORON

SLOPE FOR LOWEST CONCENTRATIONS = 50.5

RESPONSE OF NYLON-PHENOL MEMBRANE TO TETRABUTYLAMMONIUM BROMIDE

United States Patent Office 3,843,505
Patented Oct. 22, 1974

3,843,505
ION-SELECTIVE ELECTRODES FOR ORGANIC IONS
Takeru Higuchi, 2811 Schwarz Road, Lawrence, Kans. 66044
Filed June 26, 1970, Ser. No. 50,070
Int. Cl. G01n 27/46
U.S. Cl. 204—195 M
19 Claims

ABSTRACT OF THE DISCLOSURE

Concentrations of hydrophobic organic ions in aqueous solution are measured with an electrode having a polymeric membrane containing a plasticizer capable of solvating the desired ionic species. The membrane is in electrical contact with and envelopes an internal reference electrode, and this assembly is then used in connection with an additional reference electrode to make potentiometric determinations of ion concentration. The subject electrodes may be made selective toward either organic cations or anions by proper choice of the polymer-plasticizer system.

BACKGROUND OF THE INVENTION

This invention relates to the measurement of the concentration of ionic species in solution, and more particularly to a method for determining the activity or concentration of organic ionic species and novel apparatus for use in such determination.

For the electrometric determination of ionic concentrations in solutions, a number of devices are known, and typically include a reference electrode and an ion-selective electrode which when simultaneously immersed into the same body of solution, constitute an electrochemical cell, across the electrodes of which a potential develops approximately proportionately to the logarithm of the activity or the concentration in the solution of the ions to which one of the electrodes is sensitive. An electrometric device, usually either a direct reading circuit or a null-balance potentiometric circuit is employed for measuring the EMF between the electrodes.

The degree of selectivity of such ion-selective concentration electrodes may experimentally be determined normally by utilization of the Nernst equation:

$$E = E^\circ - \frac{2.303\,RT}{nF} \log \frac{[\text{outside of the electrode membrane}]}{[\text{inside of the electrode membrane}]}$$

where $E^\circ$ is the potential of the membrane system when the concentrations on both sides of the membrane are equal, $E$ is its potential under the particular conditions of the experiment, 2.303 is the conversion constant from natural logarithms to base-ten logarithms, $R$ is the gas constant, $F$ is the Faraday constant equal to 96, 489 coulombs, $n$ is the number of electrons transferred in the half-reaction, and $T$ is the absolute temperature. At constant room temperature (25° C.) the equation reduces to $$E = E^\circ - \frac{.059}{n} \log \frac{[\text{outside of the electrode membrane}]}{[\text{inside of the electrode membrane}]}$$

Thus, in a graphical plot of the negative logarithm of the activity or concentration of a monovalent ionic species sought to be determined versus the experimental EMF in millivolts, the theoretical resultant scope of the plotted data for an electrode showing exclusive selectivity for the given ionic species will be 59. The relative deviation from this value gives an indication of the degree of selectivity exhibited by the electrode employed.

Ion-selective electrodes of many kinds are well known, yet this field represents one of the most rapidly expanding areas in analytical chemistry. Most notorious of this type of electrodes are those sensitive to hydrogen. Hydrogen-sensitive electrodes have been formed of such materials as iridium, antimony, quinhydrone, platinum-hydrogen and most commonly, glass of special composition. As a more recent development, it has been discovered that glass electrodes sensitive to ions other than hydrogen, such as sodium and potassium, can be made from various specially adapted glass compositions. See, for example, U.S. Pats. No. 2,829,090 and No. 3,041,- 252. The mechanism by which the glass electrodes function is believed to be an ion exchange phenomenon taking place at the interface between the glass and the solution under test. Thus, the fact that the sensitivity of glass electrodes is primarily limited to monovalent ionic species has been postulated to be a result of the rigid and solid structure of the glass membrane. It is believed that the mobility of ions having a valence greater than one is limited in glass even though ion-exchange sites adequate both spatially and electrically are present. Moreover, it has been theoretically urged that glass electrodes cannot exhibit anionic selectivity.

Based upon the theory that electrode selectivity results from ion-exchange phenomena, several more recent developments have been directed toward providing an ion-exchange interface between an organic ion-exchange liquid and the aqueous test solution. By so doing, it is possible to achieve selectivity toward a greater variety of polyvalent ions by virtue of the increased ion mobility afforded in the liquid ion-exchange medium. In such selective electrodes, the organic and aqueous phases may be directly adjacent to one another, but most often a barrier in the form of a porous membrane or plug is placed between the two liquids. This barrier acts generally to confine the ion-exchange liquid, while at the same time it allows sufficient quantities of the aforesaid liquid to permeate therethrough in order to achieve an organic-aqueous interface at the outer, i.e. aqueous side of the barrier surface. In addition to providing selectivity toward a greater variety of polyvalent cations, the liquid ion-exchange electrodes apparently allow for the selective determination of various inorganic anionic species as well.

In an improved version of the liquid ion-exchange type electrode, the aqueous electrolyte solution surrounding the internal reference electrode has been eliminated through the use of a solid state internal reference electrode employing two layers of fused salt coated on a metallic element. See for example, U.S. Pat. No. 3,502,- 560.

Thus, while significant advances have been made in the development of ion-selective electrodes by which the activity or concentration of both mono- and poly-valent inorganic cations, as well as inorganic anions may be determined, the resultant electrodes are based on ion-exchange theory and do not have the capability of rendering selective determination of the activity or concentration of hydrophobic organic ionic species in solution.

SUMMARY OF THE INVENTION

Accordingly, it is one object of this invention to provide an improved method and apparatus for the electrometric determination of the concentration of activity in aqueous solution of hydrophobic organic ionic species, especially those containing large hydrocarbon moieties.

Another object of this invention is to provide a method and apparatus for the electrometric determination of the concentration or activity in aqueous solution of hydrophobic organic anions as well as hydrophobic organic cations.

It is a further object of this invention to provide a method and apparatus for the electrometric determination of the concentration or activity or organic ions in aqueous solution, which method and apparatus is unresponsive to the usual inorganic ionic species present.

In accomplishing these objects, one feature of this invention resides in an electrode for use in measuring the concentration of organic ionic species in an aqueous phase which comprises a polymeric membrane having dispersed therethrough a plasticizer capable of acting as a selective solvating agent for said ionic species, and an internal reference electrode element in electrical contact with and enveloped by the polymeric membrane.

Other objects, features and advantages of the invention will become more apparent from the following description of the invention and from the claims.

BRIEF DESCRIPTION OF THE DRAWINGS

In the drawings:

FIGS. 3–8 are typical Nernst response plots obtained by the method and apparatus of this invention.

DETAILED DESCRIPTION OF THE INVENTION

In accordance with this invention a novel method and apparatus has been developed for the potentiometric determination of relatively hydrophobic ions, including both organic cations and organic anions. The underlying theory of the invention is not based on ion exchange phenomena, but rather resides in the discovery that the foregoing ionic species will selectively partition into organic environments such as those offered by plasticized polymers wherein the plasticizer component comprises suitable solvating molecules for the organic ions. As the single further requirement, sufficient hydrophobicity must be conferred on the organic ions to overcome the normal hydration energies associated with ions in aqueous phase. Thus, instead of having an exchange of ions at an interface between the test solution and either a solid or liquid ion-exchange medium, the mechanics of the present invention involve absorption by a polymeric membrane of only the ionic species under study with no counter-ion transfer. Consequently, there occurs a change in the electrical potential of the polymeric membrane itself, in contradistinction to the herefore known ion-exchange-based methods wherein the potential difference is interfacially generated.

It is also possible according to the present invention to provide for the selective absorption of either organic cations or organic anions by proper selection of the polymeric membrane material and its plasticizer component. The primary determinate resides in the selection of an appropriate plasticizer, with the choice of membrane material being dictated generally by its compatibility with the chosen plasticizer. It has been found that plasticizers which have shareable electron pairs preferentially solvate organic cations, while those having acid hydrogens favor transfer of organic anions. In addition, the most highly specific responses are achieved where a highly functional, i.e. bi, tri or polydentate solvating agent is employed.

The ion-selective electrodes made according to this invention are characterized as having a standard reference electrode, e.g. calomel enveloped by the selectively permeable polymeric membrane described hereinabove. Electrical contact is provided between the standard reference electrode and the membrane, as for example by an internal reference solution. Alternatively, a solid state internal reference electrode may be employed whereby electrical contact with the plasticized membrane is provided through the fused salt layers of the reference electrode.

Figure 1:
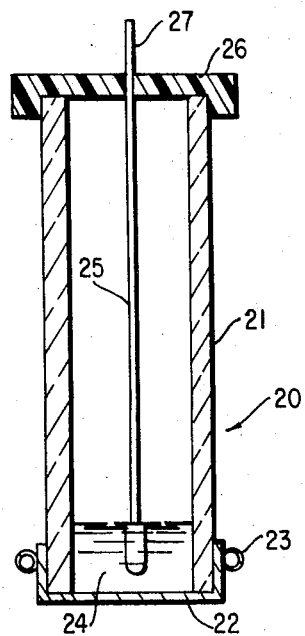
FIG. 1 is a diagrammatic cross-sectional representation of an electrode formed according to this invention.

A typical, but non-limitative embodiment of the present ion-selective electrode is illustrated in FIG. 1 of the drawings. In this embodiment electrode 20 consists of an electrically insulating container means in the form of glass tube 21 having an opening at each end thereof. To the lower end of the tube there is sealed a selectively permeable, plasticized membrane 22 which, as heretofore described, selectively absorbs organic ions from the test solution. Membrane 22 is held in place by suitable constrictive means 23 such as an elastic ring or alternatively plastic tape of polytetrafluoroethylene or the like. Disposed interiorly of tube 21 and in contact with membrane 22 is a continuous body of ion-containing reference solution 24 such as saturated aqueous NaCl solution or the like. Immersed directly in the internal reference solution 24 is electrode means 25, the portion thereof contacting the liquid 24 being preferably a standard electrode material such as calomel which ordinarily provides a standard junction potential. The upper end of tube 21 may be capped by lid 26 which acts both as a closure and as a support for electrically conductive lead 27 which forms a portion of electrode means 25.

Figure 2:
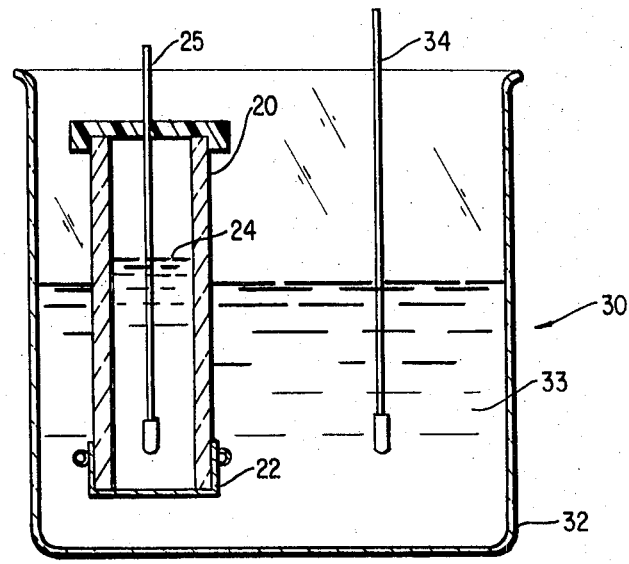
FIG. 2 illustrates a cell assembly utilized for making electrometric determinations in accordance with the present invention.

FIG. 2 illustrates a typical cell assembly wherein the subject ion-selective electrodes may be employed. The cell designated generally by reference numeral 30 consists of a suitable electrically insulating vessel 32, conveniently made of glass, into which there is placed a test solution 33 containing the ionic species, the concentration of which is sought to be determined. Placed within the test solution is a first electrode 34 constituting a standard reference electrode such as calomel or the like. The second electrode 20 comprises the ion-selective electrode of this invention as exemplified in FIG. 1. The EMF across the immersed electrodes is measured typically by either a direct reading circuit or a null-balance potentiometric circuit, both of which are well known in the art and need no further explanation.

Apparatus employing the ion-selective electrodes of this invention are capable of measuring the concentration of a wide variety of hydrophobic organic ions, especially those containing large hydrocarbon moieties. Such organic ions include without limitation, quaternary ammonium ions such as tetrabutyl ammonium, tetrapropyl ammonium, tetrapentyl ammonium, tetrahexyl ammonium, alkaloidal cations, such as dextromethorphan cations, morphine cations, diphenhydramine, promazine, phenindamine, mecloxamine, dicyclomine, and others, and as organic anions, tetraphenyl boron, alkyl aryl sulfonates, alkyl sulfates, picrate, perhalocarboxylates, methyl orange, and others. The ion-selective electrodes of this invention respond to such ions in concentration ranges as low as $2 \times 10^{-6}$ molar.

Suitable polymeric materials which may be used to form the permeable ion-selective membrane in the electrodes of this invention include without limitation addition polymers such as the vinyl polymers including polyvinyl chloride, polyethylene, polypropylene, polybutadiene, polyacrylamides, polyacrylates, polyvinylacetate, chloroprene, polystyrenes, polyacrylonitrile, etc.; condensation polymers such as polyamides, polycarbonates, polyurethanes, polyesters, polyethers, etc., and natural resins such as purified natural rubber.

As previously discussed, the plasticizer component dispersed throughout the polymeric material to serve substantially as the major solvating agent for the ionic species under determination is chosen on the basis of its selectivity toward the particular ion, those plasticizers having a shareable electron pair tending to preferentially solvate cations whereas those having acid hydrogens favor transfer of anions. Examples of the former class include, without limitation, fatty amides such as dimethyl oleamide, phthalate esters such as dimethyl phthalate, dibutyl phthalate, dioctyl phthalate, bis(2-ethylhexyl) phthalate, ditridecyl phthalate, dicyclohexyl phthalate and butylbenzyl phthalate, adipate esters such as bis(2-ethylhexyl) adipate and diisodecyl adipate, phosphates such as triphenyl phosphate, tricresyl phosphate, 2-ethylhexyl diphenyl phosphate, tris(2-ethylhexyl) phosphate and tributoxy ethyl phosphate, methyl phthalyl ethyl glycolate, butyl phthalyl butyl glycolate, sulphonamides such as N-ethyl o,p-toluene-sulfonamide and o,p-toluene-sulfonamide, chlorinated biphenyl, polyethylene glycol di-2-ethylhexoate, polyesters, epoxides and the like. The latter class of plasticizers includes without limitation, substituted phenols such as nonyl phenol, oleic acid, stearic acid, perfluoroacids and the like.

The ion-selective membranes are prepared by incorporating a plasticizer into a compatible polymeric material according to any of the known procedures. For example, polymer in powdered or other form may be dispersed in a quantity of solvent suitable to form a semigelatinous solution upon heating and stirring. To the resulting solution a plasticizer is added and uniformly incorporated by continuous heating and stirring. A thin film of the plasticized polymer solution is then spread on a suitable substrate and allowed to dry, resulting in a thin membrane suitable for use in constructing the ion-selective electrodes of this invention.

It will be appreciated that theoretically there is no lower limit upon the amount of plasticizer to be incorporated in the membrane as even minute amounts will respond to the presence of a selected ion in the adjacent test solution. On the other hand, the upper limit of plasticizer is dictated solely by the practical consideration that a given polymer can accomodate only a given amount of plasticizer before becoming too pliable to be of use in the present application. In practice the amount of plasticizer typically ranges from about 5 to 120 parts per 100 parts of polymeric material. The thickness of the polymeric membrane is more or less a matter of choice, though in practice it will typically range from about 10 to 500 microns.

It will likewise be appreciated that numerous physical relationships of the polymeric membrane to the internal reference electrode are possible. The term "envelopd" is to be interpreted in its broadest sense to include all physical embodiments ranging from the above described electrically insulating container having a polymeric membrane sealed across one end, to a unitary electrode structure comprising a standard internal reference electrode embedded in a plasticized polymeric membrane.

Selectivity of a given combination of polymer and plasticizer toward a particular organic ionic species is only partly predictable, exact determinations necessarily being made essentially by experiment. Such experimentation is conducted utilizing a cell assembly like that illustrated in FIG. 2 and described in connection therewith. A test solution containing the organic ion to be determined is placed in the cell followed by insertion of the standard reference electrode and the indicator electrode of this invention containing a selected plasticized membrane. When a steady potential is obtained across the two electrodes, the concentration of organic ion in the test solution is gradually increased in predetermined amounts and the change in potential recorded. A truly ion-selective electrode will follow the Nernst relationship, and will thus show a potential change of approximately 59 millivolts for each ten fold change in concentration of the organic ionic species. This relationship may readily be examined by plotting the potential versus the negative logarithm of the ion concentration, and measuring the slope of the resultant plot.

To determine the degree of preferential selectivity of the present electrodes toward organic ions over inorganic ions which may normally be present in a test solution under practical conditions, an essentially identical procedure as just outlined is followed except that various inorganic ions are introduced into the test solution along with the organic ions. Any deviation from the theoretical Nernst relationship indicates interference from the inorganic ions and consequently some electrode selectivity for certain of these ions as well as the organic ion. It can easily be established which inorganic ion or ions are giving rise to the selective response by merely carrying out the foregoing test procedure using a test solution containing only a single inorganic ionic species.

A selectivity constant for a given membrane electrode indicating its preference for the organic ionic species over inorganic ions present can be calculated theoretically according to the Eisenman definition:

$$E\begin{pmatrix} M_I^+ = 0.1\ M \\ M_O^+ = 0 \end{pmatrix} - E\begin{pmatrix} M_I^+ = 0 \\ M_O^+ = 0.1\ M \end{pmatrix}$$
$$= -\left(\frac{RT}{F}\right) \ln K_{M_O^+/M_I^+}$$

where E equals the measured potential, $M_I+$ and $M_O+$ represent the concentrations of the inorganic and organic ionic species respectively, R is the gas constant, T the absolute temperature, F. the Faraday constant, and K the selectivity constant for the given comparative ion pair. A high value for the constant K. indicates a high degree of selectivity for the organic ion over the inorganic ion.

Specific, but non-limiting examples of polymer-plasticizer combinations and organic ions which are selectively absorbed thereby are:

(1) polyvinyl chloride membrane plasticized with dioctyl-phthalate for determination of tetrabutyl ammonium cation;

(2) polyvinyl chloride membrane plasticized with dimethyl oleamide for determination of dextromethorphan cation;

(3) nylon membrane plasticized with nonyl phenol for determination of tetraphenylboron anion;

(4) polyvinyl chloride membrane plasticized with dioctyl phthalate for determination of phenhydramine cation.

The ion-selective electrodes of this invention are suitable for application in any of the numerous areas of analytical chemistry where selective determination of organic ionic species is desired. Moreover, by virtue of the very short response periods exhibited by the present electrodes (generally on the order of about 3 seconds), they are ideally suited for use as end-point indicator electrodes in titration procedures.

The following examples will serve to illustrate the invention without in any way being limiting thereon.

Example 1

Preparation of an ion-selective membrane.—A 10 g. sample of powdered polyvinyl chloride (Bakelite QYKV, Blend 1, Union Carbide) resin is placed in a wedgewood mortar and there is added sufficient 1,2-dichloroethane solvent to yield a uniform dispersion devoid of any large agglomerates of powder. The dispersion is transferred to a graduated 250 ml. beaker and stirred magnetically while additional solvent is added to the 150 ml. mark. The resulting mixture is covered and heated to about 30–50° C. Stirring and heating are continued until a fairly translucent semi-gelatinous solution is obtained. A 10 g. sample of dioctyl phthalate plasticizer (Aldrich Chemical Co.) is then added to the translucent solution with stirring and heating continued for about 1 hour to insure uniform incorporation of the plasticizer in the solution. A thin film of the solution is then applied to a glass plate with the aid of a thin-layer chromatography spreader set at 80 microns, and the film is allowed to dry. Upon drying a thin plastic membrane results which is suitable for the preparation of ion-selective electrodes according to this invention.

An electrode of the type illustrated in FIG. 1 is constructed by sealing the foregoing plasticized-PVC membrane to the end of a glass tube with Teflon tape. Inside the tube is placed a saturated NaCl solution, and a standard calomel electrode is immersed in the saturated salt solution.

Example 2

Experimental determination of ion-selectivity.—The ion-selective electrode of Example 1 and a standard calomel electrode are placed in a $5 \times 10^{-6}$ molar solution of tetrabutylammonium bromide solution in distilled water. An Orion Model 801 digital ionalyser is used to measure the potential between the two electrodes while the concentration of tetrabutyl ammonium cation is raised by measured five- or ten-fold amounts. A graphical presentation of the potention readings in millivolts plotted against the negative logarithm of the tetrabutylammonium cation concentration is prepared on regular coordinate paper and is represented by FIG. 3 of the drawings. The slope of the plotted curve is calculated as −59, indicating a theoretical Nernst response of the ion-selective electrode employing a PVC-dioctylphthalate membrane for tetrabutylammonium ion.

Examples 3 and 4

The ion-selective electrode of Example 1 is tested for its selectivity toward inorganic cations by repeating the procedure of Example 2 for test solutions consisting first of potassium bromide in distilled water and then hydrogen chloride in distilled water. The following data is obtained from the two experimental trials:

TABLE I

Response of PVC-DOP membrane to potassium bromide

| Conc. KBr (M) | −Log [K+] | E (mv.) |
| --- | --- | --- |
| $5 \times 10^{-6}$ | 5.3 | −103 |
| $1 \times 10^{-5}$ | 5.0 | −86 |
| $5 \times 10^{-5}$ | 4.3 | −88 |
| $1 \times 10^{-4}$ | 4.0 | −91 |
| $5 \times 10^{-4}$ | 3.3 | −87 |
| $1 \times 10^{-3}$ | 3.0 | −67 |
| $1 \times 10^{-2}$ | 2.0 | −42 |

TABLE II

Response of PVC-DOP membrane to HCl

| Conc. HCl (M) | −Log [H+] | E (mv.) |
| --- | --- | --- |
| $1 \times 10^{-5}$ | 5.0 | −114 |
| $5 \times 10^{-5}$ | 4.3 | −76 |
| $1 \times 10^{-4}$ | 4.0 | −76 |
| $5 \times 10^{-4}$ | 3.3 | −79 |
| $1 \times 10^{-3}$ | 3.0 | −85 |
| $1 \times 10^{-2}$ | 2.0 | −60 |
| $1 \times 10^{-1}$ | 1.0 | −32 |

It is seen from the foregoing data that the PVC-dioctylphthalate membrane of the ion-selective electrode shows no selectivity toward these inorganic cations, and consequently it is expected that the PVC-dioctylphthalate electrode will selectively determine the concentration of tetrabutyl ammonium cations in the presence of potassium and hydrogen ions.

Example 5

The procedure of Example 2 is repeated except that each determination of cell potential is made for tetrabutyl ammonium ion in the presence of both potassium and hydrogen ions by maintaining 0.1N concentrations of KBr and KH$_2$PO$_4$ in the test solution. A typical Nernst potential plot of the data, presented in FIG. 4, shows good linearity and a nearly theoretical slope of −58.5, confirming the lack of interference by potassium and hydrogen ions in the selective determination of the tetrabutyl ammonium ion. This is further demonstrated by the following Eisenman Selectivity Constants calculated for tetrabutyl ammonium ion (TBA+) in conjunction with potassium (K+) and hydrogen (H+) ions:

$$K_{TBA+/K+} = 7.4 \times 10^5$$
$$K_{TBA+/H+} = 2.3 \times 10^6$$

Examples 6–8

Figure 5:
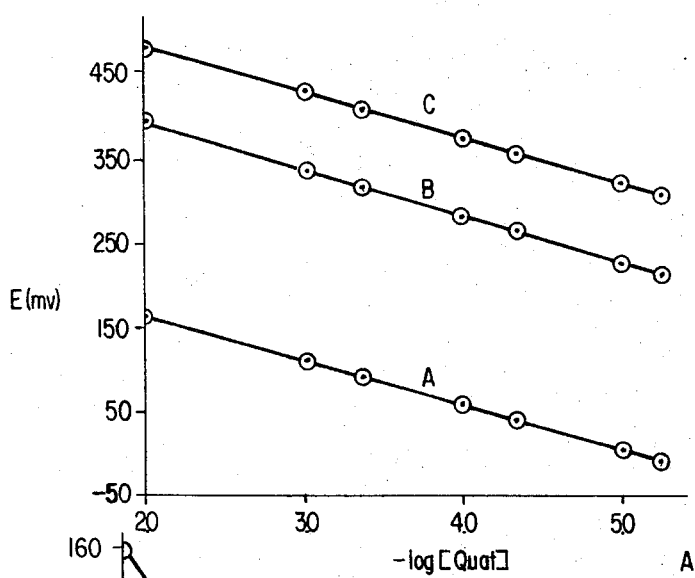

The procedure of Example 2 utilizing the PVC-dioctylphthalate membrane electrode is repeated for other quaternary ammonium ions. Nernst potential plots of the results are represented in FIG. 5, and the curves show the following slopes:

Curve A—Tetrapropyl ammonium: Slope=−57.5
Curve B—Tetrapentyl ammonium: Slope=−59.5
Curve C—Tetrahexyl ammonium: Slope=−58.5

In each instance a Nernstian or nearly Nernstian response is obtained.

Example 9

Figure 6:
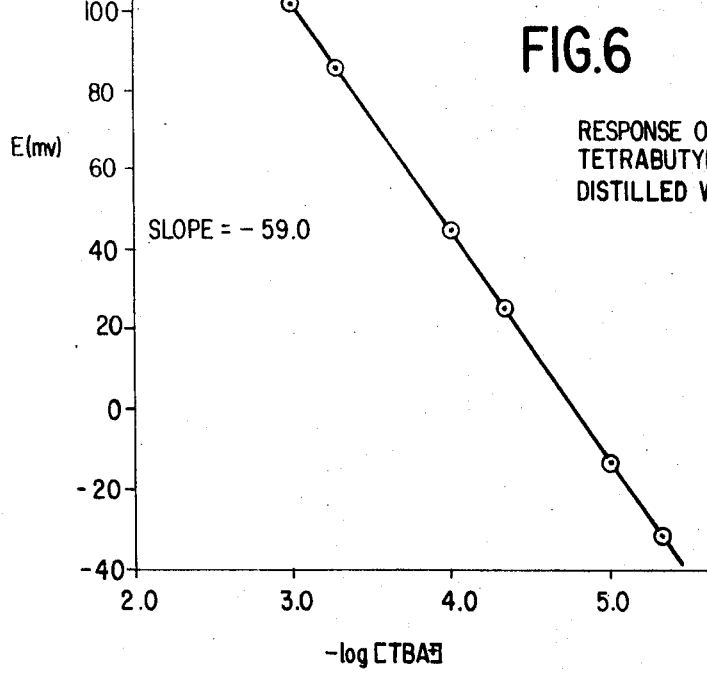

Using an indicator electrode having a membrane of PVC plasticized with N,N-dimethyl oleamide, the procedure of Example 2 is repeated except that the test solution consists of dextromethorphan hydrobromide in distilled water. FIG. 6 represents a typical Nernst potential plot of the results which has a slope of −59 indicating a Nernstian response of the PVC-dimethyl oleamide membrane for dextromethorphan ion.

Example 10

Figure 7:
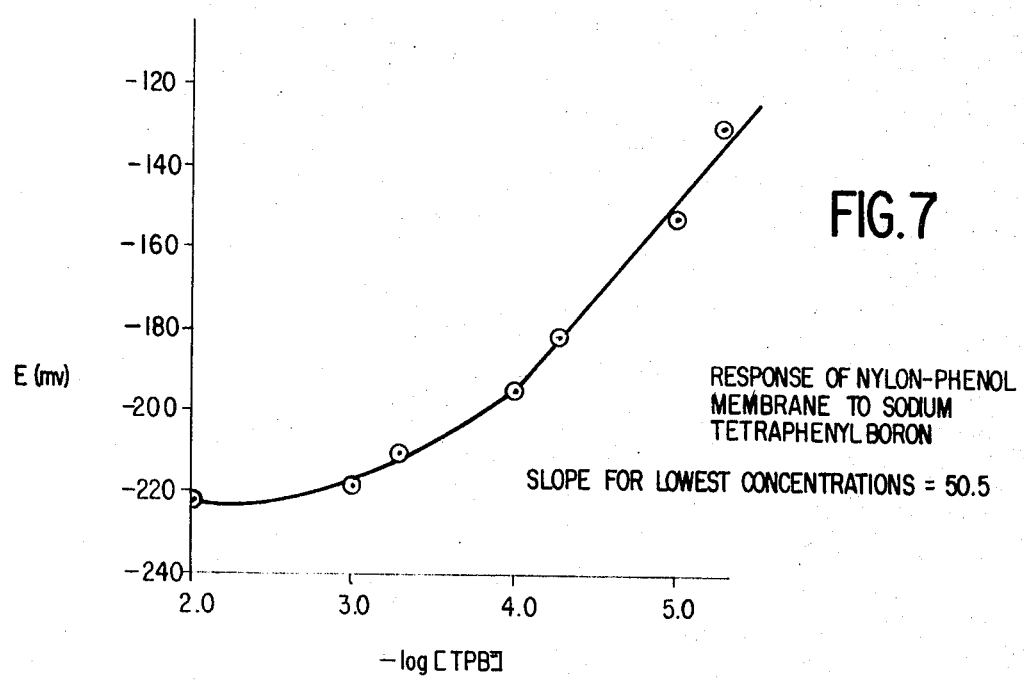

Using an indicator electrode employing a membrane of nylon plasticized with nonylphenol, the procedure of Example 2 is repeated to determine the response of the electrode to both organic anions and organic cations. FIG. 7 represents the results of a Nernst potential study of the nylon-nonylphenol membrane for its response to tetraphenyl boron anion (sodium tetraphenyl boron in distilled water). From FIG. 7 it is seen that a nearly Nernstian relationship is obtained in the lower concentration range, while deviation from this relationship occurs a higher ion concentrations, probably due to micellarization of the tetraphenyl boron ions.

Figure 8:
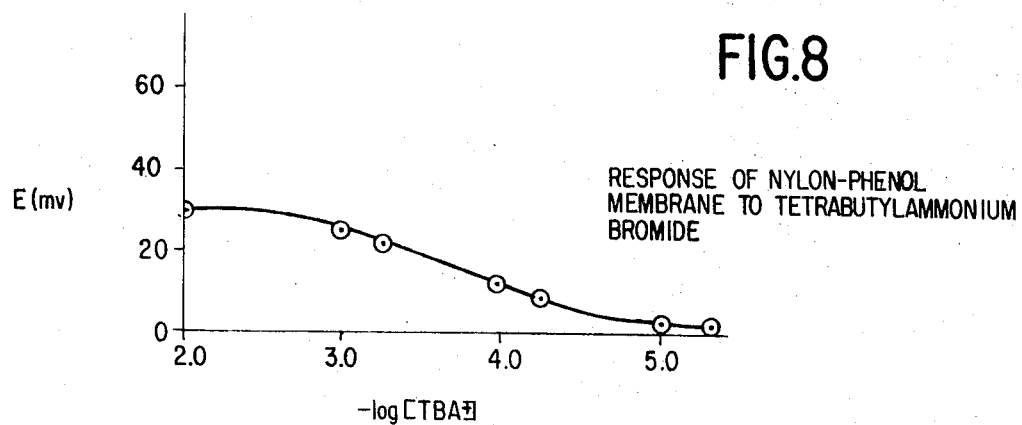

FIG. 8 demonstrates a total lack of theoretical response of the nylon-nonylphenol electrode to an organic cation, tetrabutyl ammonium.

Example 11

Figure 9:
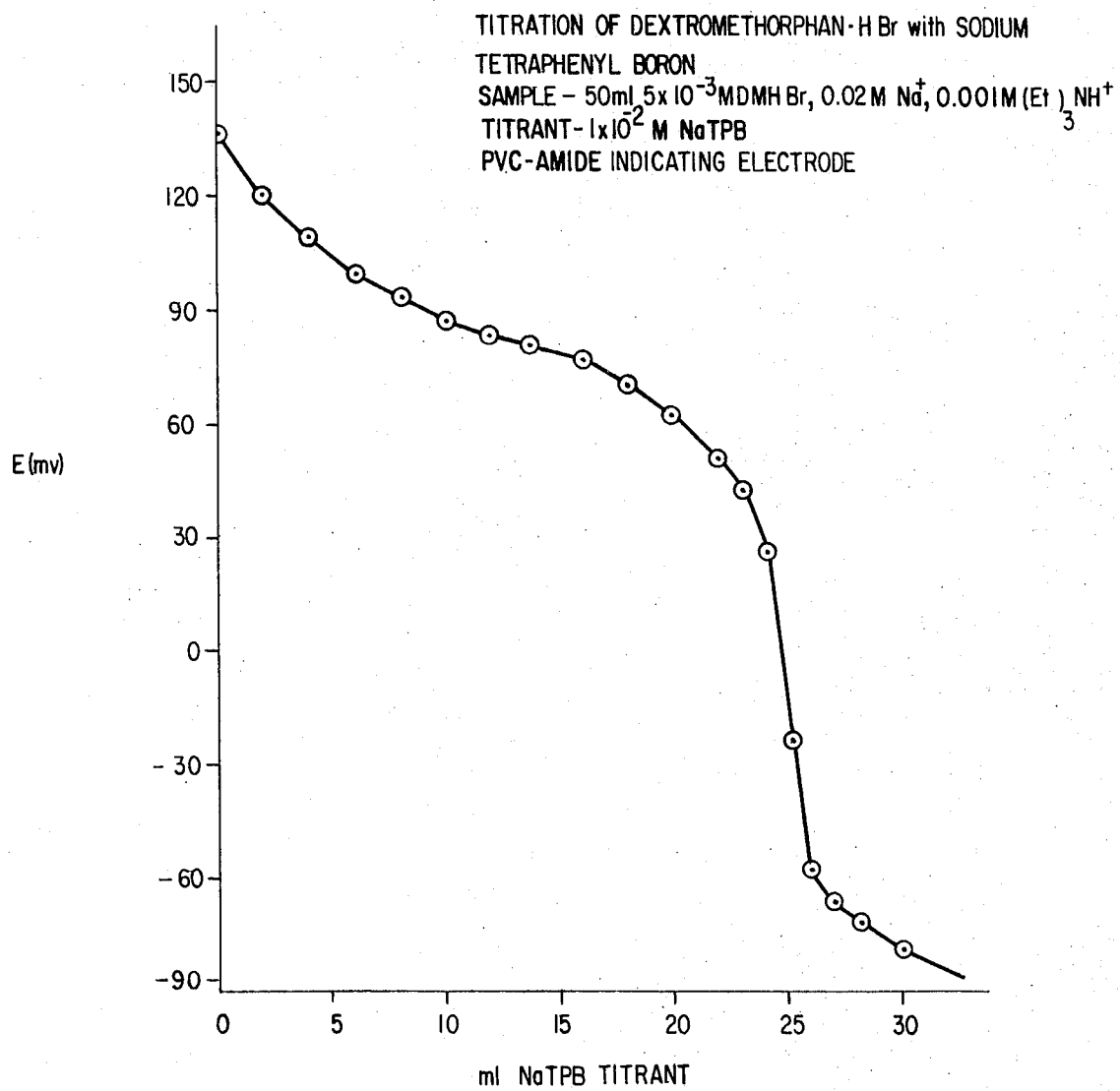
FIG. 9 is a titration curve obtained by using an ion-selective electrode according to this invention.

Application as titration indicator electrode:

An indicator electrode of this invention having a PVC-dimethyl oleamide membrane, and a standard calomel electrode are placed in a 50 ml. sample of $5 \times 10^{-3}$ M dextromethorphan hydrobromide, additionally containing a 0.02 M concentration of sodium ion and a 0.001 M concentration of triethyl ammonium ion, i.e., a relatively small organic ion. The sample is then titrated with 0.1 M sodium tetraphenyl boron, and the electrode potential measured with an Orion Model 801 digital ionalyser. FIG. 9 demonstrates that a good potentiometric end point is visible, indicating no interference by the other ions present in the titration.

Thus, this invention provides a practical means for the selective measurement of hydrophobic organic ion concentrations in aqueous solution, a result heretofore unachievable by electrometric means. An ion-selective electrode comprising a reference electrode in electrical contact with and enveloped by a plasticized polymeric membrane is provided. The electrode may be rendered selective toward either organic cations or organic anions by choosing a polymer-plasticizer combination which selectively solvates the desired species.

While there have been shown and described and pointed out the fundamental novel features of the invention as applied to the preferred embodiment, those skilled in the art will appreciate that various modifications, changes, and omissions in the ion-selective electrode illustrated and described can be made without departing from the spirit of the invention. It is the intention, therefore, to be limited only by the scope of the following claims.

What is claimed is:

1. An electrode useful in measuring the concentration, in an aqueous phase, of hydrophobic organic ionic species selected from the group consisting of hydrophobic organic cations and hydrophobic organic anions, said electrode comprising:
   a membrane consisting essentially of a polymer having dispersed therethrough a compatible organic plasticizer capable of solvating, absorbing and transferring said ionic species, said plasticizer being selected from the group consisting of dioctyl phthalate and dimethyl oleamide; and
   an internal reference electrode element in electrical contact with and enveloped by said membrane.

2. An electrode according to Claim 1, wherein said polymer comprises an addition polymer, a condensation polymer or a natural resin.

3. An electrode according to Claim 1, wherein said membrane is from about 10 to 500 microns in thickness.

4. An electrode according to Claim 1, wherein said membrane contains from about 5 to 120 parts of plasticizer per 100 parts of polymer.

5. An electromotive cell comprising:
   (1) an electrically-insulating container adapted to contain an aqueous solution which contains hydrophobic organic ions whose concentration is to be measured, said hydrophobic organic ions being selected from the group consisting of hydrophobic organic cations and hydrophobic organic anions;
   (2) a standard reference electrode disposed in said container and adapted to be in electrical contact with said aqueous solution; and
   (3) the electrode of Claim 1 disposed in said container and adapted to be in electrical contact with said aqueous solution, whereby when an electromotive potential is established between said standard reference electrode (2) and said electrode (3), said potential is proportional to the logarithm of the concentration of said hydrophobic organic ions in said aqueous solution.

6. The electrode of Claim 1 wherein said membrane consists essentially of polyvinyl chloride having dispersed therethrough a plasticizer comprising dimethyl oleamide, said membrane being selective in the measurement of the concentration of dextromethorphan cations in aqueous solution.

7. An electrode according to Claim 1, useful for the selective measurement of the concentration of hydrophobic organic cations in aqueous solution, wherein said polymer comprises polyvinyl chloride and wherein said plasticizer comprises dioctyl phthalate.

8. An electrode useful in measuring the concentration, in an aqueous phase, of hydrophobic organic ionic species selected from the group consisting of hydrophobic organic cations and hydrophobic organic anions, said electrode comprising:
   a membrane consisting essentially of a polymer having dispersed therethrough a compatible organic plasticizer capable of solvating, absorbing and transferring said ionic species, said plasticizer being selected from the group consisting of substituted phenols, oleic acid, stearic acid and perfluoro acids; and
   an internal reference electrode element in electrical contact with and enveloped by said membrane.

9. An electrode according to Claim 8, wherein said membrane is from about 10 to 500 microns in thickness.

10. An electrode according to Claim 8, wherein said membrane contains from about 5 to 120 parts of plasticizer per 100 parts of polymer.

11. An electrode according to Claim 8, wherein said polymer comprises an addition polymer, a condensation polymer or a natural resin.

12. The electrode of Claim 11 wherein said addition polymer is a vinyl polymer selected from the group consisting of polyvinyl chloride, polyethylene, polypropylene, polybutadiene, polyacrylamides, polyacrylates, polyvinylacetate, chloroprene, polystyrenes, and polyacrylonitrile.

13. The electrode of Claim 11 wherein said condensation polymer is selected from the group consisting of polyamides, polycarbonates, polyurethanes, polyesters, and polyethers.

14. The electrode of Claim 11 wherein said natural resin is natural rubber.

15. The electrode of Claim 8 wherein said plasticizer is nonyl phenol.

16. The electrode of Claim 8 wherein membrane consists essentially of nylon having dispersed therethrough a plasticizer comprising nonyl phenol, said membrane being selective for measuring the concentration of tetraphenylboron anions in aqueous solution.

17. An electromotive cell comprising:
   (1) an electrically-insulating container adapted to contain an aqueous solution which contains hydrophobic organic ions whose concentration is to be measured, said hydrophobic organic ions being selected from the group consisting of hydrophobic organic cations and hydrophobic organic anions;
   (2) a standard reference electrode disposed in said container and adapted to be in electrical contact with said aqueous solution; and
   (3) the electrode of Claim 8 disposed in said container and adapted to be in electrical contact with said aqueous solution, whereby when an electromotive potential is established between said standard reference electrode (2) and said electrode (3), said potential is proportional to the logarithm of the concentration of said hydrophobic organic ions in said aqueous solution.

18. An electrode assembly for measuring the concentration, in aqueous solution, of hydrophobic organic ions selected from the group consisting of hydrophobic organic cations and hydrophobic organic anions, comprising a hollow container having an opening therein, a membrane disposed across said opening, said membrane consisting essentially of a polymer having dispersed therethrough a compatible plasticizer capable of selectively solvating, absorbing and transferring said organic ions, said plasticizer being selected from the group consisting of dioctyl phthalate and dimethyl oleamide; an electrically conductive solution disposed within said container in contact with said membrane; and a reference electrode having a stable contact potential disposed in said container and being in electrical contact with said membrane through said conductive solution.

19. An electrode assembly for measuring the concentration, in aqueous solution, of hydrophobic organic ions selected from the group consisting of hydrophobic organic cations and hydrophobic organic anions, comprising a hollow container having an opening therein, a membrane disposed across said opening, said membrane consisting essentially of a polymer having dispersed therethrough a compatible plasticizer capable of selectively solvating, absorbing and transferring said organic ions, said plasticizer being selected from the group consisting of substituted phenols, oleic acid, stearic acid and perfluoro acids; an electrically conductive solution disposed within said container in contact with said membrane; and a reference electrode having a stable contact potential disposed in said container and being in electrical contact with said membrane through said conductive solution.

References Cited

UNITED STATES PATENTS

| | | | |
|---|---|---|---|
| 3,429,785 | 2/1969 | Ross | 204—195 L |
| 3,562,129 | 2/1971 | Simon | 204—195 M |
| 3,445,365 | 5/1969 | Ross | 204—195 L |

(Other references on following page)

UNITED STATES PATENTS

| | | | |
|---|---|---|---|
| 3,298,944 | 1/1967 | Luck | 204—195 F |
| 3,450,631 | 6/1969 | Bloch et al. | 204—195 M |
| 3,655,526 | 4/1972 | Christian | 204—195 T |

OTHER REFERENCES

"Analytical Chem.," vol. 39, No. 10, 1967, pp. 1056–1065.

"Ion-Selective Electrode," NBS special publication 314 (1969), pp. 89–94.

Pungor et al., "Acta Chim. Hung.," Tomus 41, 1964, pp. 239–255.

TA-HSUNG TUNG, Primary Examiner

U.S. Cl. X.R.

204—1 T

UNITED STATES PATENT OFFICE
CERTIFICATE OF CORRECTION

Patent No. 3,843,505        Dated October 22, 1974

Inventor(s) Takeru Higuchi

It is certified that error appears in the above-identified patent and that said Letters Patent are hereby corrected as shown below:

Page 1, column 1, directly after the zip code in the inventor's address, insert the following:

--Assignor to INTERx Research Corporation, Lawrence, Kans.--

Signed and sealed this 4th day of February 1975.

(SEAL)
Attest:

McCOY M. GIBSON JR.
Attesting Officer

C. MARSHALL DANN
Commissioner of Patents